(12) United States Patent
Stegelmann

(10) Patent No.: US 7,051,051 B1
(45) Date of Patent: May 23, 2006

(54) RECOVERING FROM FAILED OPERATIONS IN A DATABASE SYSTEM

(75) Inventor: Rolf Günter Erich Stegelmann, Valencia, CA (US)

(73) Assignee: NCR Corp., Dayton, OH (US)

( * ) Notice: Subject to any disclaimer, the term of this patent is extended or adjusted under 35 U.S.C. 154(b) by 379 days.

(21) Appl. No.: 09/729,806

(22) Filed: Dec. 5, 2000

(51) Int. Cl.
*G06F 12/00* (2006.01)

(52) U.S. Cl. ..................... 707/202; 707/200

(58) Field of Classification Search ............... 707/200, 707/201, 202, 203, 204, 100, 102; 714/20, 714/15, 21
See application file for complete search history.

(56) References Cited

U.S. PATENT DOCUMENTS

| | | | | |
|---|---|---|---|---|
| 5,675,727 A | * | 10/1997 | Watanabe | 714/20 |
| 5,933,838 A | * | 8/1999 | Lomet | 707/202 |
| 6,349,310 B1 | * | 2/2002 | Klein et al. | 707/200 |

OTHER PUBLICATIONS

NCR Corporation, "Introduction to Teradata RDBMS," V2R4.0/V2R4.0.1, pp. i-xxii-1-1 to 8-14 (Sep. 2000).

* cited by examiner

*Primary Examiner*—Sam Rimell
(74) *Attorney, Agent, or Firm*—Trop, Pruner & Hu P.C.

(57) ABSTRACT

In a database system, when an operation (a request or a transaction) that modifies one or more rows of a table is performed, multiple images of the row that is being modified (e.g., added, deleted, or updated) is stored in the table. State identifiers are provided to identify the state of each row, such as a "before image" row and an "after image" row. A before image row represents a row before a modification or "mutation" operation is performed. An after image row represents the latest row as processed by a current modification operation. A before image row is retained in each table as long as the transaction that created or updated the row is active. As soon as the transaction commits successfully, the before image rows become reusable and can be reused by another request or transaction. The state identifier associated with each row can also indicate that a "mutation" is not being performed on a row; that is, an operation that modifies the contents of the row is not currently being performed.

35 Claims, 5 Drawing Sheets

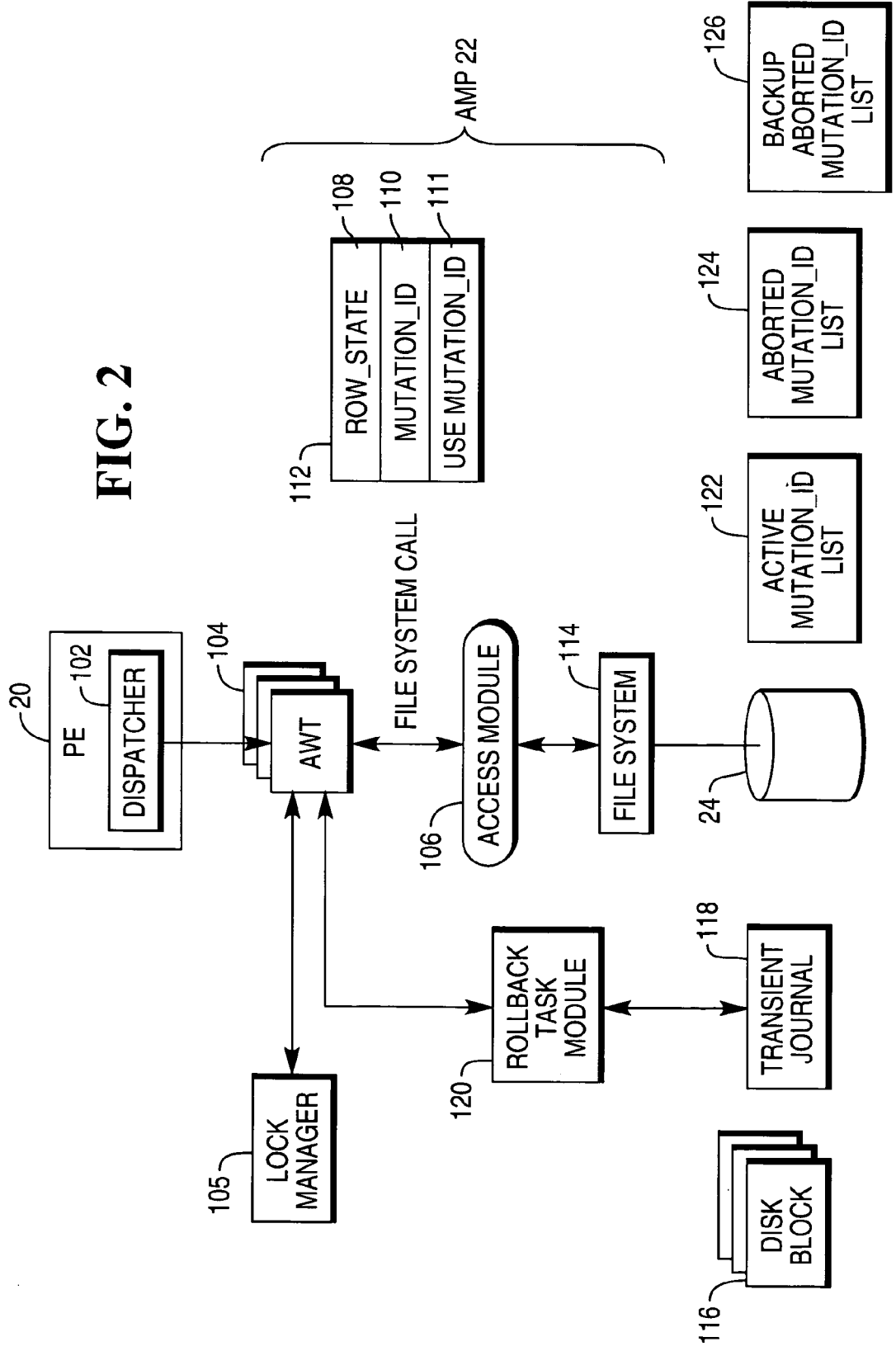

RECOVERING FROM FAILED OPERATIONS IN A DATABASE SYSTEM

TECHNICAL FIELD

The invention relates to recovering from failed operations in a database system.

BACKGROUND

A database is a collection of stored data that is logically related and that is accessible by one or more users. A popular type of database is the relational database management system, which includes relational tables made up of rows and columns. Each row represents an occurrence of an entity defined by the table, with an entity being a person, place, or thing about which the table contains information. Various types of operations can be performed in the database system.

In one arrangement, to extract data from a relational table, Structured Query Language (SQL) statements can be issued to the database system. In response to SQL statements, data is extracted from one or more tables in the database system. SQL statements include data definition language (DDL) statements that are used to define database structures and data manipulation language (DML) statements that manipulate rows and data values. Examples of DML statements include INSERT, SELECT, UPDATE, and DELETE.

During a database operation, the system may crash, causing the operation to fail. The crash may be a software module crash, or the crash may be an overall system crash. Typically, incomplete user updates are "rolled back" before the system is available for use again. Rollback refers to the process of recovering the prior state of a portion of a table before the start of the incomplete update request or transaction. Because of the potentially large amounts of updates that may have been performed at the time of the system crash, the amount of time needed to roll back user updates may be relatively long, making the system unavailable for a substantial amount of time after restart. For many users, this relatively long delay may be unacceptable.

To enable faster access to the system, a deferred recovery mechanism is employed in some database systems. When the database system is restarted after a crash, the database system is available for general use, but access is not permitted to tables (or rows of tables) for incomplete user updates that need to be rolled back. Although the user has quicker availability to a database system after restart using the latter technique, a portion of the data still remains unavailable until after rollback has been completed.

Another issue in some database systems is that, as a row in a table is being changed, the "before image" of the row is copied to a journal, which is another table in the database system. The before image of the row represents the row before the update or change operation started. Thus, if a system was to crash, the before image of the row in the journal can be used to recover or roll back a transaction to a state prior to the crash. The process of copying a row to the journal takes up system bandwidth, and adds to delays in operations performed in the database system.

SUMMARY

In general, database system comprises one or more storage devices containing a table having plural rows. The plural rows include a first row containing a before image representing data before a data modification operation and a second row containing an after image representing data processed by the data modification operation.

Other features and embodiments will become apparent from the following description, from the drawings and from the claims.

BRIEF DESCRIPTION OF THE DRAWINGS

FIG. 2 is a block diagram of a portion of the database system of FIG. 1.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
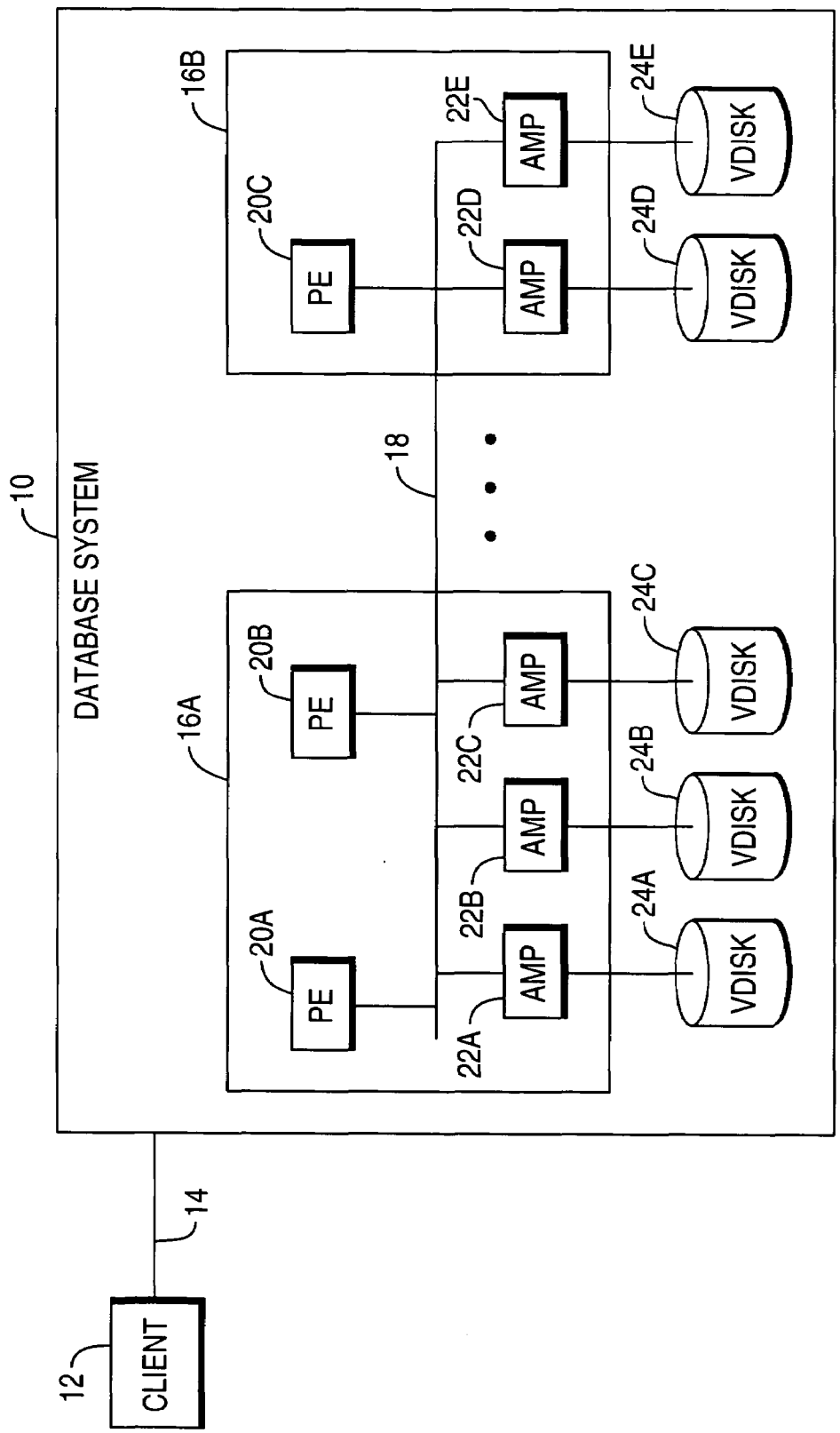
FIG. 1 is a block diagram of an embodiment of a database system and a terminal for accessing the database system.

FIG. 1 illustrates an example of a database system 10 that is coupled to a client system 12 over a network 14. Examples of the network 14 include a local area network (LAN), a wide area network (WAN), or a public network (such as the Internet). The user at the client system 12 can issue requests, such as Structured Query Language (SQL) requests, to the database system 10 to extract data stored in the database system 10. SQL is the language of relational databases, and is defined by the American National Standards Institute (ANSI). SQL provides for data definition language (DDL) statements that define database objects and the relationships that exist among them. Examples of DDL statements include statements to create or modify tables and views. SQL also provides for data manipulation language (DML) statements that manipulate, change, or retrieve data rows of the database. Examples of DML statements include SELECT, UPDATE, DELETE, and INSERT.

In the illustrated embodiment, the database system 10 includes multiple nodes 16A and 16B. The arrangement of the database system 10 in FIG. 1 is provided as an example, as other arrangements are possible in other embodiments. For example, the database system 10 can be a single-node system (with one or plural processors).

In the multi-node database system of FIG. 1, the nodes 16A and 16B are coupled to an interconnect network 18. The nodes 16A and 16B include virtual processors (VPROCs), which include parsing engines (PEs) 20A, 20B, and 20C and access module processors (AMPs) 22A, 22B, 22C, 22D and 22E. The PEs and AMPs are software processes that are executable in corresponding nodes 16A, 16B to enhance concurrency in execution of disk access tasks. In the example arrangement of FIG. 1, PEs 20A, 20B and AMPs 22A, 22B, and 22C are executable in the node 16A, and PE 20C and AMPs 22D and 22E are executable in the node 16B.

Each PE 20 is made up of the following components: session control block, parser, and dispatcher. The session control block performs user logon and logoff tasks. The parser interprets SQL statements, checks them for proper SQL syntax, and evaluates them semantically. In response to an SQL statement, the dispatcher in the PE 20 controls the sequence of steps that are executed and passes the steps to the AMPs 22. The dispatcher also receives status reports from the AMPs as they process the steps. Depending on the SQL request, a step may be sent to one AMP, a number of AMPs, or all AMPs.

Each AMP 22 manages a portion of the database and performs the following example tasks on the database: sorting, aggregating, formatting and converting. Each AMP 22 includes a database manager that locks databases and tables; creates, modifies, or deletes definitions of tables; inserts, deletes or modifies rows within the tables; and retrieves information from definitions and tables. A database manager also returns responses to the dispatcher in a PE 20.

As further shown in FIG. 1, each AMP 22 is associated with a disk 24 that contains data associated with a portion of the database. The total disk space associated with each AMP is referred to as a "virtual disk (VDISK)." As shown in FIG. 1, the AMPs 22A–22E are associated with respective disks 24A–24E.

In accordance with some embodiments of the invention, when an operation (a request or a transaction) that modifies one or more rows of a table in the database system 10 is performed, multiple images of the row that is being modified (e.g., added, deleted, or updated) is stored in the table. As used here, a transaction is the overall operation that is to be performed on one or more rows of a table. Each transaction includes one or more requests. For example, in one transaction, a first request can add a first row, update the first row, delete a second row, and so forth.

State identifiers are provided to identify the state of each row, such as a "before image" row and an "after image" row. A before image row represents a row before a modification or "mutation" operation is performed. A modification operation refers to any operation (transaction or request) in which a portion of a table is being changed. An after image row represents the latest row as processed by a current modification operation. Normally, a subsequent access of the row will not seek out the row marked as the before image but rather seek the row marked as the after image. A before image row is retained in each table as long as the transaction that created or updated the row is active. As soon as the transaction commits successfully, the before image rows become reusable and can be reused by another request or transaction. The state identifier associated with each row can also indicate that a "mutation" is not being performed on a row; that is, an operation that modifies the contents of the row is not currently being performed.

By maintaining plural images of each row in a table, an efficient mechanism is provided to roll back to the original state of the row if an abort occurs during an operation in which one or more rows of a table are being modified. A rollback operation refers to the procedure for recovering a prior state of a row (or other portion) of a table before the modification operation is performed. For each row that is subject to a modification operation, the original row is marked as the before image row. For example, the original row becomes the before image row if the modification operation is a row delete operation. If the modification operation is an update operation of a row, then the original row is marked as the before image row and a new row (containing the updated information) is created and marked as the after image row. By keeping plural images of each row in the table that is subject to a modification operation, the plural images are readily accessible to a user even during an abnormal condition, such as after the system restart due to an abort or a system crash. Although reference is made to maintaining plural images of table rows in the described embodiments, plural images of other portions of a table can be maintained in other embodiments.

If an operation that is modifying a table or row should abort or fail for some reason, the before image row becomes the current row and the after image row can be discarded. A benefit offered by some embodiments of the invention is that contents of a row are accessible by a user even though a rollback is being performed. As a result, users do not have to wait for a rollback operation to complete for access to data, including data that are the target of modification at the time of the abort. A further benefit of keeping the before image in the table itself is that copying of the before image row to a journal, such as a transient journal, can be avoided if desired. This reduces the amount of data transfer that is occurring during a table operation so that more bandwidth is available to perform other database access tasks.

FIG. 2 shows some components of the PE 20, the AMP 22 and a disk 24, in accordance with an example arrangement. A dispatcher 102 in the PE 20 passes requests to AMP worker tasks (AWTs) 104 in the AMP 22 as a sequence of steps. One or more AWTs 104 perform actions requested by the dispatcher 102.

The AMP 22 also includes a lock manager 105 to protect against concurrent updates of data in tables stored in the disk 24. An access module 106, in accordance with some embodiments, enables the creation and processing of multiple images of each row of a table that is being modified. The access module 106 effectively provides a middle layer between the file system 114 and the AWTs 104 to properly handle the plural images of each row. The images are tracked using identifiers that include a ROW_STATE field 108 and a MUTATION_ID field 110 contained in a context block 112. The ROW_STATE field 108 and MUTATION_ID field 110 are updated when a modification operation (transaction or request) is performed on a row, with the ROW_STATE and MUTATION_ID fields passed by an AWT 104 in a file system call. The context block 112 also contains a USING_MUTATION_ID flag that is set to true if the MUTATION_ID field 110 is contained in the context block 112. The file system call is passed through the access module 106 to a file system 114 that performs accesses of tables in the disk 24. In one embodiment, each table is stored in disk blocks 116 in the disk 24. The contents of an example disk block 116 are illustrated in FIG. 3A.

A transient journal 118 is also contained in the disk 24 to store a table identifier (TABLE_ID), row identifiers (ROW_IDs), locking information, and the MUTATION_ID information of rows that have been deleted, inserted, and updated (that is, subjected to a modification operation). In one embodiment, the transient journal 118 does not store a copy of the before image of a row that is being modified, which avoids the need to copy a potentially large row from a table to the transient journal each time an operation modifies the content of a row. If an abort of a modification operation is detected, then a rollback task 120 uses the row IDs in the transient journal 118 to remove after image rows in a table of the affected rows.

The database system also maintains an ACTIVE_MUTATION_ID list 122, an ABORTED_MUTATION_ID list 124, and a BACKUP_ABORTED_MUTATION_ID list 126, with the MUTATION_ID list 122 and ABORTED_MUTATION_ID list 124 stored in the disk 24, and the BACKUP_ABORTED_MUTATION_ID list 126 stored on a backup AMP on a different node. When a modification operation is aborted, the ABORTED_MUTATION_ID list 124 is transmitted to a backup AMP for storage as the BACKUP_ABORTED_MUTATION_ID list 126. This ensures that if the ABORTED_MUTATION_ID list 124 becomes unavailable for some reason, the BACKUP_ABORTED_MUTATION_ID list 126 can be used to reactivate the before images and delete the after images. The lists 122, 124 and 126 are all retained within a crash proof area of the database system. For example, the lists 122 and 124 are kept on allocated portions of the disk 24 or some other form of non-volatile memory. Similarly, the list 126 is kept on allocated portions of a disk or other non-volatile memory associated with the backup AMP on a different node.

For each active transaction or request, a MUTATION_ID is added to the ACTIVE_MUTATION_ID list 222. The list is in general not larger than the number of concurrent transactions and requests associated with the AMP 22. When a transaction or request is aborted, the corresponding MUTATION IUD is added to the ABORTED_MUTATION_ID list 124. The ABORTED_MUTATION_ID list 124 also contains a flag to indicate whether it is the request or transaction that is aborting.

FIG. 3A shows an example disk block 116, which stores a portion of a table. As shown in FIG. 3A, each row 200 in the disk block 116 includes a row header 202 that contains various flags, the ROW_STATE field 204, and the row data 206. In addition, MUTATION_ID fields 208A and 208B (if present) point to respective rows 200A and 200B. Alternatively, the MUTATION_ID fields 208 may be kept in each row 200 instead of as a pointer in a separate portion of the disk block 116. The MUTATION_ID fields 208 are present only if the ROW_STATE field indicates a row is subject to a modification opeation.

The ROW_STATE field 204 has four possible values, in accordance with one embodiment, as illustrated in Table 1 below:

TABLE 1

| ROW_STATE | Description |
| --- | --- |
| 00 | Image (I) |
| 01 | Transaction Before Image (TBI) |
| 10 | Request Before Image (RBI) |
| 11 | Request After Image (RAI) |

A ROW_STATE value of 00 (binary value) indicates that there are no current changes associated with this row (the current image or I) and that there is no MUTATION_ID information. A value 01 indicates that the row is the before image of a transaction (TBI) and that a MUTATION_ID exists. This status is generated every time an existing row is being modified for the first time (in a new transaction). A value of 10 represents that the row is the before image of a request (RBI). This row status exists if the same row is modified more than once for the same transaction. A value of 11 represents that the row is the request after image (RAI); that is, the row is the latest row and contains modified data.

Figure 3B:
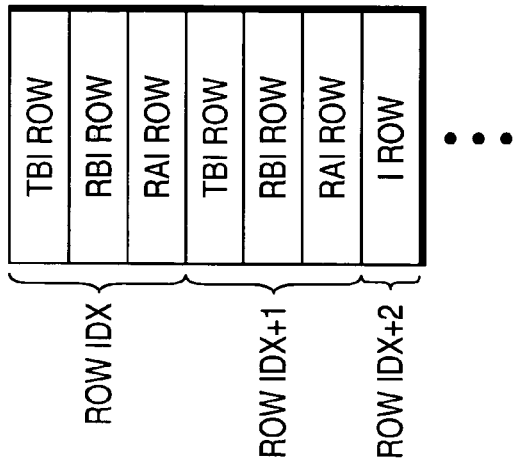
FIGS. 3A–3B illustrate disk blocks that store portions of a table.
Figure 3A:
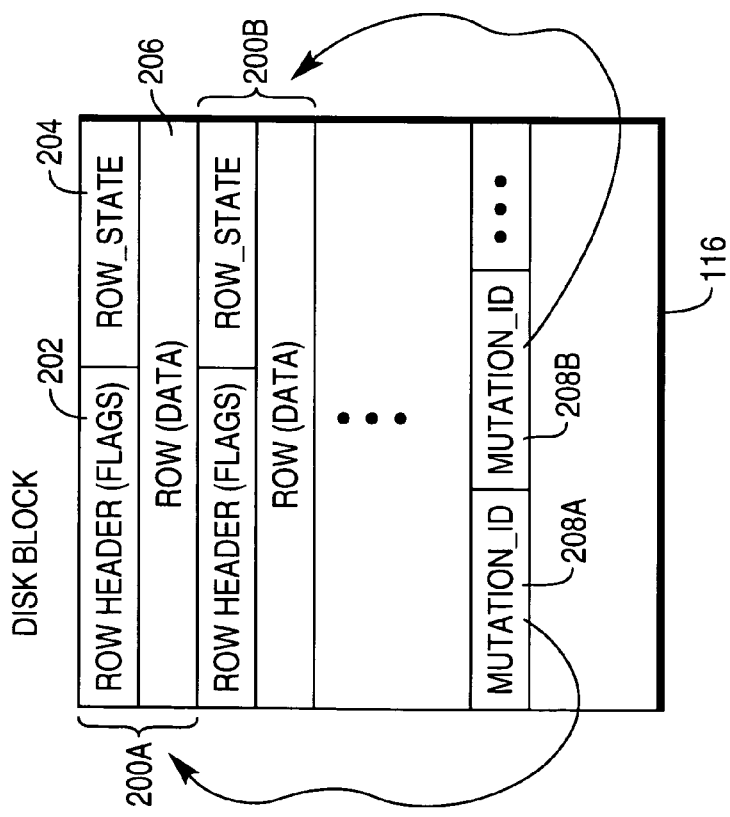

As shown in FIG. 3B, in one arrangement, the TBI row, RBI row, and RAI row for each row (associated with a given ROW_ID) appear in order so that the file system 114 does not have to hunt for the several images (if present) of a row. Thus, for example, the TBI row, RBI row, and RAI row of the row having row identifier ROW_IDx are arranged in series, and the TBI row, RBI row, and RAI row of the row having row identifier ROW_iDx+1 are arranged in series. However, the row having row identifier ROW_IDx+2 is not being modified so that only the current image (I) of the row is stored in the table.

Figure 4:
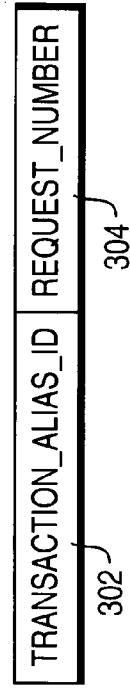
FIG. 4 illustrates a MUTATION_ID field that is stored in the disk block of FIG. 3.

As shown in FIG. 4, the MUTATION_ID field 208 includes two parts: a TRANSACTION_ALIAS_ID portion 302 and a REQUEST_NUMBER portion 304. The TRANSACTION_ALIAS_ID portion 302 is an identifier associated with an active transaction. The number increments for each new transaction created in the AMP 22 (the TRANSACTION_ALIAS_ID value is assigned one per transaction per AMP). A restart of the system does not reset the value of TRANSACTION_ALIAS_ID. The REQUEST_NUMBER portion 304 is a number that identifies a request associated with a transaction. Within a given transaction, one or more requests are performed one at a time.

Each MUTATION_ID is thus associated with a transaction-request number pair (corresponding to a unique combination of the TRANSACTION_ALIAS_ID and REQUEST_NUMBER). A MUTATION_ID value is allocated when a transaction is received by an AMP, and the MUTATION_ID value is updated when a new request in the same transaction is received. The MUTATION_ID value is added to an entry of a table corresponding to the modified row as well as to the ACTIVE_MUTATION_ID list 122. The MUTATION_ID value is maintained for as long as a transaction has not committed. SQL provides a COMMIT statement that makes "permanent" all changes performed in a current transaction. After a transaction has been committed, the access module 106 removes the MUTATION_Id associated with a request from the ACTIVE_MUTATION_ID list 122 (FIG. 2).

If a transaction abort or a request abort occurs, then appropriate processing of the affected row is performed by the rollback task 120 (FIG. 2). The corresponding MUTATION_ID is also added to the ABORTED_MUTATION_ID list 124. At the completion of the abort operation, the rollback task 120 marks the TBI row as the current row (that is, the row state of the TBI row is changed to indicate that the row is the current image row). The rollback task 120 also deletes, or marks as available for reuse, the RAI row.

The file system 114 bases its decision on how to handle requests for accesses to rows in a table on information in the MUTATION_ID field 110 of the context block 112, the MUTATION_ID field 208 in the disk block 116, the value of the ROW_STATE field 204 in each row, the content of the ACTIVE_MUTATION_ID list 122, and the content of the ABORTED_MUTUATION_ID list 124.

Tables 2, 3, and 4 below explain how a row state is affected in response to an abort, commit, or read request, respectively. If a request or transaction is aborted, then the rollback task 120 (FIG. 2) handles each row according to Table 2 below.

TABLE 2

| Row State | Result |
| --- | --- |
| 01 (ar) | 01 → 00 |
| 01 (at) | 01 → 00 |
| 11 (a) | 11 → x |
| 10 (ar) | 10 → 00 |
| 10 (at) | 10 → x |

If the row state is 01 (TBI row containing the transaction before image), and the abort is a request abort (ar), then the row state is changed from 01 to 00 (the current image state) if the TBI row is associated with the request that aborted. The rollback task 120 also removes the MUTATION_ID associated with the row from the table. If the TBI row is not associated with the request that aborted, the state of the TBI row is not changed.

If the row state is 01 (TBI row), and the abort is a transaction abort (at), then the row state is changed from 01 to 00, and the MUTATION_ID associated with the row is removed from the disk block 116.

If the row state is 11 (RAI row), and the abort is either a transaction or request abort (a), then the RAI row is removed and/or marked as reusable (11→x). If the row state is 10 (RBI row), and the abort is a request abort (ar), then the RBI row is made the current row by changing the row state from 10 to 00. However, if the row state is 10 but the abort is a transaction abort (at), then the RBI row is deleted and/or marked as reusable (10→x). The RBI row is not needed since the TBI row is marked as the current image row (ROW_STATE=00).

The rollback processing can proceed on a time available basis. The instance a transaction aborts, the system makes available the before images of all changes made by the aborted transaction to all new transactions, without the requirement that the rollback to the aborted transaction complete first.

When a transaction for a given row commits, Table 3 shows how the TBI, RAI, and RBI rows are handled by the access module 106.

TABLE 3

| Row State | Result |
| --- | --- |
| 01 (TBI) | 01 → x |
| 11 (RAI) | 11 → 00 |
| 10 (RBI) | 10 → x |

The TBI row (which contains the transaction before image) is deleted or is marked as being reusable by another transaction (01→x). The RAI row (which contains the request after image) is converted to have the row state 00 (11→00) to indicate that this is the current image of the row. Also, the MUTATION_ID field 204 is removed from the disk block 116 since a modification of the row is no longer occurring. The RBI (which contains the request before image) is deleted or marked as being reusable by another transaction (10→x). Also, once a transaction commits, the corresponding MUTATION_ID is also removed from each of the ACTIVE_MUTATION_ID and ABORT_MUTATION_ID lists 122 and 124.

If the file system 114 receives a read request for a row, Table 4 below indicates how the access module 106 processes the request given the row state of the affected row.

TABLE 4

| Row State | Result |
| --- | --- |
| 00 (I) | Pointer to row returned |
| 01 (TBI) | Row is ignored (as if not there) |
| 11 (RAI) | Pointer to row is returned |
| 10 (RBI) | Row is ignored (as if not there) |
| 01 (TBI) (abort) | Pointer to row is returned |
| 11 (RAI) (abort) | Row is ignored (as if not there) |
| 10 (RBI) (abort) | Pointer to row is returned |

For a row having ROW_STATE with the value 00, the pointer to the row is returned since that is the current image of the row (that is, a modification operation is not currently active for the row). However, if a row is subject to a current modification operation, then TBI, RAI, and RBI rows may be present. The TBI row (containing the transaction before image) and RBI row (containing the request before image) are ignored, while the pointer to the RAI (request after image or latest image) is returned.

For a current modification operation that has been aborted, as indicated by "(abort)" in Table 4, then the pointer to the TBI row or RBI row is returned, while the RAI row is ignored. The process of selecting a row to return to the AWT 104 in response to a read request is further explained below in connection with FIG. 5.

Figure 5:
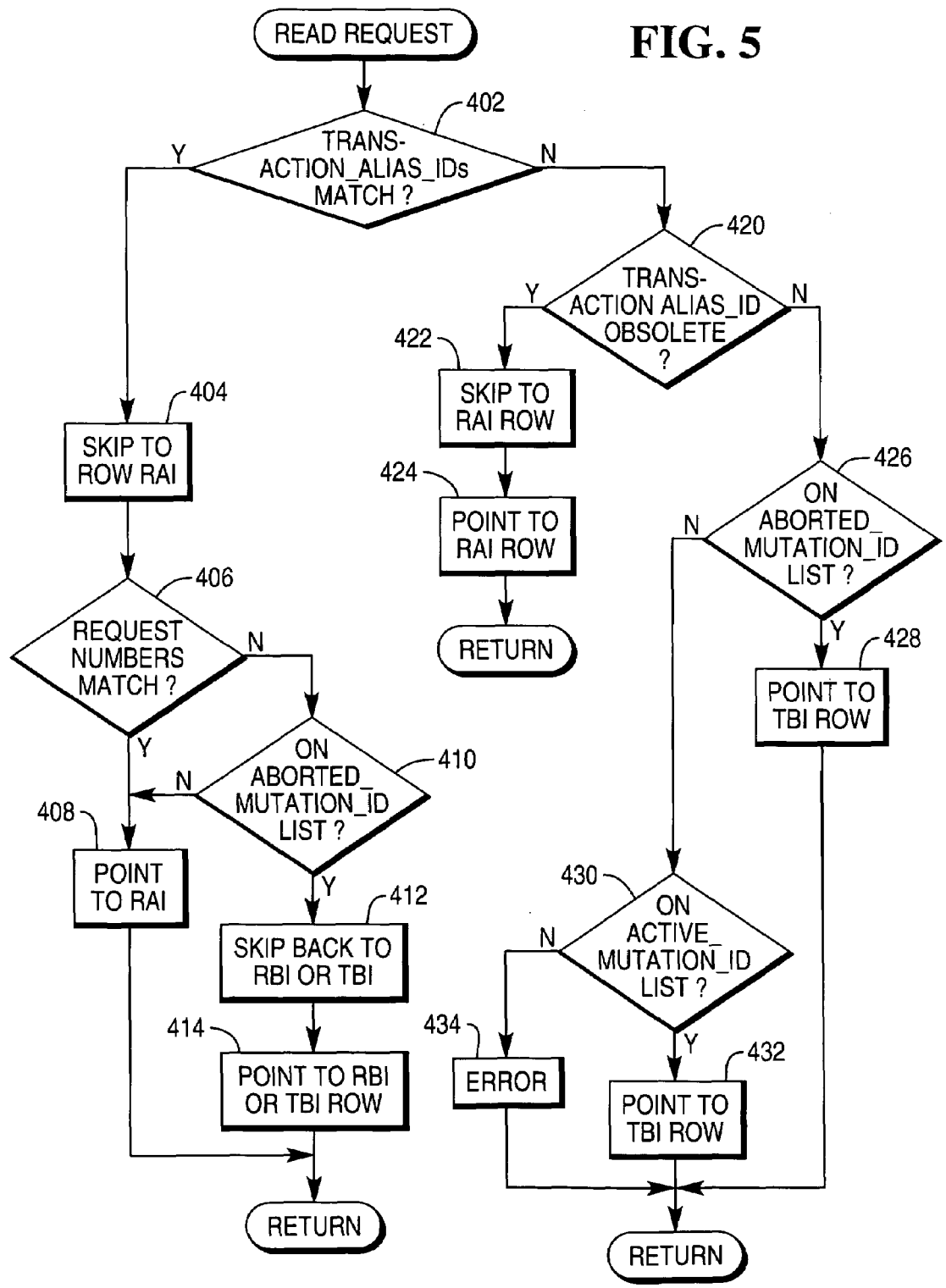
FIG. 5 is a flow diagram of a process responding to a read request for a row that is being modified.

FIG. 5 is a flow diagram of a process performed by the access module 106 (FIG. 2) in response to receipt of a read request from an AWT 104, the read request being associated with a MUTATION_ID (from the context block 112). Generally, if the MUTATION_ID of the read request matches the MUTATION_ID of the row, then the RAI row (containing the request after image) is returned to the AWT 104. In the flow diagram, the access module 106 determines (at 402) if the TRANSACTION_ALIAS_ID of the read request and the TRANSACTION_ALIAS_ID of the requested row (based on the row identifier ROW_ID) matches. If so, the access module 106 skips (at 404) to the RAI row, and checks (at 406) if the REQUEST_NUMBER associated with the read request matches the REQUEST_NUMBER in the requested row. If so, the interface points (at 408) to the RAI row, which is the row returned by the access module 106 to the AWT 104 in response to the read request.

However, if the access module 106 determines (at 406) that the REQUEST_NUMBERs do not match (that is, the MUTATION_IDs of the read request and the requested row are not equal), then the access module 106 accesses (at 410) the ABORTED_MUTATION_ID list 124 to determine if the MUTATION_ID is on the list. If not, indicating that an abort operation is not occurring, the access module 106 points (at 408) to the RAI row. However, if the MUTATION_ID is on the ABORTED_MUTATION_ID list 124, then the access module 106 skips back (at 412) to the RBI row (or to the TBI row if the RBI row is not present). The access module 106 then points (at 414) to the RBI row or TBI row, which is returned in response to the read request.

The MUTATION_IDs of the read request and the requested row may also not match for another reason: the TRANSACTION_ALIAS_IDs do not match. If the access module 106 determines this is so at 402, then it checks to determine (at 420) if the TRANSACTION_ALIAS_ID is obsolete (that is, the MUTATION_ID is not on either the ACTIVE_MUTATION_ID list 122 or ABORTED_MUTATION_ID list 124). Since TRANSACTION_ALIAS_ID increments with each new transaction, the determination of whether MUTATION_ID is obsolete is based on determining if TRANSACTION_ALIAS_ID (from the context block 112) is less than a parameter OBSOLETE_BEGIN_RANGE. The parameter OBSOLETE_BEGIN_RANGE is set to the lowest of the TRANSACTION_ALIAS_IDs on the ACTIVE_MUTATION_ID list 122 and ABORTED_MUTATION_ID list 124. If obsolete, the access module 106 skips (at 422) to the RAI row and points (at 424) to the RAI row as the row to return in response to the read request.

If however, the TRANSACTION_ALIAS_ID is not obsolete, then the access module 106 checks (at 426) to determine if the MUTATION_ID is on the ABORTED_MUTATION_ID list 124. If so, the access module 106 points (at 428) to the TBI row as the row to return. If the MUTATION_ID is not on the ABORTED_MUTATION_ID list 124, the access module 106 then checks (at 430) to determine if the MUTATION_ID is on the ACTIVE_MUTATION_ID list 122. If so, then another transaction that updated this row is still in progress and the access module 106 points (at 432) to the TBI row to not let the current transaction see the uncommitted change. Optionally, it is valid to return the RAI row instead of the TBI row (432). This is done if the reading transaction specifies that dirty reads (reads of changes of uncommitted transactions) are allowed.

If, however, the MUTATION_ID is also not on the ACTIVE_MUTATION_ID list 122, then the access module 106 takes the error path (at 434) since this would be an impossible situation.

The access module 106 also passes the parameter OBSOLETE_BEGIN_RANGE to the file system 114 to allow the removal of old TBI or RBI rows from a block in a table when any row in a block is being updated. As the file system 114 accesses a block in the table, and if it determines that the TRANSACTION_ALIAS_ID field associated with any TBI or RBI row in the block is less than the OBSOLETE_BEGIN_RANGE, then the TBI or RBI row can be removed. It is also possible for a background process to perform this cleanup activity periodically or to be performed on an as needed basis if space runs low.

The access module 106 also controls how states of each row are transitioned based on an input request (e.g., insert row, delete row, or update row). State transition tables are illustrated below for the different input requests and different initial states of rows. Given a ROW_STATE value and an input command sent to the file system 114, an output is generated that represents the action performed by the file system 114 on the pertinent row(s). The symbols used in the state transition tables are as follows. The symbol (cr) represents that the operation is being performed on a row associated with the current request. The operation references the MUTATION_ID stored in the disk block 116 associated with the row instead of the MUTATION_ID field 110 in the context block 112 for the command. The symbol (or) indicates that the operation is being performed on a row associated with an old request, but a current transaction. The symbol (ot) indicates that the operation is being performed on a row associated with an old transaction. The symbol (ct) indicates that the operation is associated with a current transaction.

The output symbols are as follows: (nr) represents a new row; (u) represents update data; (x) represents a deleted row; and (opt) represents that the file system 114 may optionally delete the row if it needs room in the disk block 116.

The NEXT_ROW_STATE column shows the next state of the row(s) along with the following explanation: (g) to represent a good state or commit state as opposed to an abort state; (ar) to represent a request abort state based on the aborted MUTATION_ID list 124; (at) to represent a transaction abort state based on the aborted MUTATION_ID list 124; and (a) which is the same as (ar) or (at).

Table 5 below represents operations that can be performed on a row that does not exist (has state X). If the row does not yet exist, delete and update operations are not allowed; any attempt at deleting or updating a non-existent row produces an error. However, a row insert operation is allowed, and the new row (nr) has the row state 11, with the state indicated as good (g).

TABLE 5

| # | Row State | Inputs | Outputs | Next Row State |
|---|-----------|--------|---------|----------------|
| 1 | X | Insert | nr → 11 | 11 (g) |
| 2 |   | Delete | —       | ERROR  |
| 3 |   | Update | —       | ERROR  |

Table 6 below represents operations performed on a row having state 00 (current image or I state). An insert operation (entry #1) is not allowed. A delete operation (entry #2) causes the access module 106 to change the state of the row from 00 to 01, with the row becoming the TBI row. An update operation (entry #3) causes the current row to become the TBI row (00→01) and a new row to be created that contains the content of the original row along with the updated (u) data. The new row has state 11 (RAI row).

TABLE 6

| # | Row State | Inputs | Outputs | Next Row State |
|---|-----------|--------|---------|----------------|
| 1 | 00 (I) | Insert | — | ERROR |
| 2 |        | Delete | 00 → 01 | 01 (g) |
| 3 |        | Update | 00 → 01<br>00 + u → 11 | 01, 11 (g) |

Table 7 below involves operations on a TBI row. An insert operation (entry #1) on a row associated with a current request or old request in a current transaction causes a new row (nr) to be created with the 11 (RAI) state. The new row is created since the insert operation is not aware of the TBI row. The current row remains the TBI row, while the new row is the RAI row.

An insert operation (entry # 2), performed on a row associated with an old transaction (ot) causes a new row (nr) to be created as a RAI ROW_STATE=11) while the TBI row associated with the old transaction can be removed (optionally) or marked as available for reuse.

A delete or update (entries #3 and 4) of the TBI row is not allowed and produces an error. In case of an abort of a current request (cr), as shown in entry #5, the row state remains 01 and is associated with the request abort (ar) state. The TBI row will be saved if the transaction commits (since it is only the request that aborted, not the transaction). In case of an abort of a current transaction (ct), as shown in entry #6, the row state remains 01 and is associated with the transaction abort (at) state. The row will be saved in the rollback process.

TABLE 7

| # | Row State | Inputs | Outputs | Next Row State |
|---|-----------|--------|---------|----------------|
| 1 | 01 (TBI) | Insert (cr, or) | nr → 11 | 11 (g)<br>01 (g) |
| 2 |          | Insert (ot) | 01 → x (opt)<br>nr → 11 | 11 (g)<br>01 (g) |
| 3 |          | Delete | — | ERROR |
| 4 |          | Update | — | ERROR |
| 5 |          | Abort (cr) |   | 01 (ar) |
| 6 |          | Abort (ct) |   | 01 (at) |

Table 8 below is the transition table for an RAI row. An insert (entry #1) into an RAI row is not allowed, and produces an error. A delete operation of a row (entry #2) associated with a current request (cr) causes the row state to transition from 11 to x, which marks the row as being deleted or reusable by another transaction. Since the row was not there at the beginning of the current request, then the row should be removed.

A delete operation (entry #3) of a row associated with an old request (or) causes the row state to transition from 11 to 10 so that the RAI row of the previous request becomes the RBI row. A delete operation (entry #4) of a row associated with an old transaction (ot) will cause the RAI row to become the TBI row (11→01).

An update operation (entry #5) of a row associated with a current request (cr) causes the RAI row to be updated (11+u) and maintain the 11 row state. Since the update is for the same request, a new before image row is not needed.

If an update operation (entry #6) is performed on a row associated with an old request (or), however, a new row is created containing the updated image (11+u), which has the 11 row state, while the previous RAI row becomes an RBI row (11→10). An update operation (entry #7) of a row associated with an old transaction causes the RAI row to become the TBI row (11→01) while a new row is created including the updated row (11+u), which has the row state 11.

The row state of the RAI row remains 11 in response to an abort (entry #8) of the current request or transaction (cr, ct), but will be deleted by a rollback process.

TABLE 8

| # | Row State | Inputs | Outputs | Next Row State |
|---|---|---|---|---|
| 1 | 11 (RAI) | Insert | — | ERROR |
| 2 | | Delete (cr) | 11 → x | X |
| 3 | | Delete (or) | 11 → 10 | 10 (g) |
| 4 | | Delete (ot) | 11 → 01 | 01 (g) |
| 5 | | Update (cr) | 11 + u → 11 | 11 (g) |
| 6 | | Update (or) | 11 → 10 | 10, 11 (g) |
| 7 | | Update (ot) | 11 → 01 | 01, 11 (g) |
| | | | 11 + u → 11 | |
| 8 | | Abort (cr, ct) | | 11 (a) |

Table 9 below shows processing of an RBI image. If the operation is an insert operation (entry #1) of a row associated with a current request (cr), then a new row (nr) is created having row state 11 since the RBI row is not found by the insert operation. Both the RBI and RAI rows will have the same MUTATION_ID value.

An insert operation (entry #2) of a row associated with an old request or old transaction (or, ot) will cause the row to be optionally deleted (10→x), with a new row (nr) created with the row state 11.

A delete or update operation (entries #3 and 4) of an RBI row is not allowed. An abort (entry #5) of a current request will cause the row to maintain the 10 row state with a request abort (ar) state. The row will be saved once the transaction commits. An abort (entry #6) of a current transaction will cause the row to maintain the 10 row state with a transaction abort (at) state. The row will be deleted by a rollback process.

TABLE 9

| # | Row State | Inputs | Outputs | Next Row State |
|---|---|---|---|---|
| 1 | 10 (RBI) | Insert (cr) | nr → 11 | 11 (g) |
| | | | | 10 (g) |
| 2 | | Insert (or, ot) | 10 → x (opt) | 11 (g) |
| | | | nr → 11 | 10 (g) |
| 3 | | Delete | — | ERROR |
| 4 | | Update | — | ERROR |
| 5 | | Abort (cr) | | 10 (ar) |
| 6 | | Abort (ct) | | 10 (at) |

Table 10 below shows the processing of a row (associated with a given ROW_ID) that is associated with a TBI row and an RAI row. An insert operation (entry #1) into the row is not allowed and produces an error. A delete operation (entry #2) associated with a current request (cr) causes the RAI row to be deleted since the delete operation is part of the same request that created the 11 state.

A delete operation (entry #3) on a row associated with an old request (or) causes the RAI row to become the TBI row (11→10) since the current delete request is different than a request that created the 11 state. A delete operation (entry #4) on a row associated with an old transaction (ot) causes the TBI row to be deleted (01→x), while the RAI row is made the TBI row (11→01).

An update operation (entry #5) on a row associated with a current request (cr) causes the RAI row to be replaced with the updated row (with the row state remaining as 11). The TBI row remains unchanged.

An update operation (entry #6) on a row associated with an old request (or) causes the RAI row to be changed to the RBI row (11→10), and a new row to be added (having row state 11) that contains the updated RAI row. The TBI row remains unchanged. As a result of this operation, three rows are present: the TBI row, the RBI row (which was the previous RAI row), and a new RAI row.

An update operation (entry #7) on a row associated with an old transaction (ot) causes the TBI row to be deleted (01→x), the RAI row to be changed to the TBI row (11→01), and a new row (having row state 11) to be added that contains the updated RAI row. Two rows remain as a result of this operation: the TBI row (previous RAI row) and the newly created RAI row.

An abort (entry #8) of a current request (cr) will cause the TBI and RAI rows to maintain their respective 01 and 11 row states and be associated with the request abort (ar) state. The RAI row will be deleted as a result of a rollback operation. An abort (entry #9) of a current transaction (ct) will cause the TBI and RAI rows to maintain their respective 01 and 11 row states and be associated with the transaction abort (at) state. The RAI image will be deleted as a result of a rollback operation, while the TBI row will be restored as the current image.

TABLE 10

| # | Row State | Inputs | Outputs | Next Row State |
|---|---|---|---|---|
| 1 | 01, 11 | Insert | — | ERROR |
| 2 | | Delete (cr) | 11 → x | 01 (g) |
| 3 | | Delete (or) | 11 → 10 | 01, 10 (g) |
| 4 | | Delete (ot) | 01 → x | 01 (g) |
| | | | 11 → 01 | |
| 5 | | Update (cr) | 11 + u → 11 | 01, 11 (g) |
| 6 | | Update (or) | 11 → 10 | 01, 10, 11 (g) |
| | | | 11 + u → 11 | |
| 7 | | Update (ot) | 01 → x | 01, 11 (g) |
| | | | 11 → 01 | |
| | | | 11 + u → 11 | |
| 8 | | Abort (cr) | | 01, 11 (ar) |
| 9 | | Abort (ct) | | 01, 11 (at) |

Table 11 below shows processing of a row associated with an RBI row and an RAI row. An insert operation (entry #1) produces an error. However, a delete operation (entry #2) of a row associated with a current request causes the row to be deleted. A delete operation (entry #3) of a row associated with an old request in the current transaction causes the RBI row to be deleted while the RAI row becomes the RBI row (11→10). A delete operation (entry #4) of a row associated with an old transaction causes the RBI row to be deleted and the RAI row to become the TBI row (11→01).

An update operation (entry #5) of a row associated with the current request causes the RAI row to be replaced with the updated image. An update operation (entry #6) of a row associated with an old request in the current transaction causes the RBI row to be deleted, the RAI row to become the RBI row, and a new RAI row to be created that contains the updated image (11+u). An update operation (entry #7) of a row associated with an old transaction causes the RBI row to be deleted, the RAI row to become the TBI row, and a new row to be created that contains the updated RAI row.

An abort (entry #8) of the current request causes the rows to maintain their respective row states and be associated with the request abort (ar) state. The rollback process will keep the RBI image. An abort (entry #9) of the current transaction causes the rows to maintain their respective states, but both rows will be deleted in the rollback process.

TABLE 11

| # | Row State | Inputs | Outputs | Next Row State |
|---|---|---|---|---|
| 1 | 10, 11 | Insert | | ERROR |
| 2 | | Delete (cr) | 11 → x | 10 (g) |
| 3 | | Delete (or) | 10 → x<br>11 → 10 | 10 (g) |
| 4 | | Delete (ot) | 10 → x<br>11 → 01 | 01 (g) |
| 5 | | Update (cr) | 11 + u → 11 | 10, 11, (g) |
| 6 | | Update (or) | 10 → x<br>11 → 10<br>11 + u → 11 | 10, 11 (g) |
| 7 | | Update (ot) | 10 → x<br>11 → 01<br>11 + u → 11 | 01, 11 (g) |
| 8 | | Abort (cr) | | 10, 11 (ar) |
| 9 | | Abort (ct) | | 10, 11 (at) |

Table 12 below shows processing of a row associated with a TBI row and an RBI row. An insert (entry #1) into the row causes a new row to be created that has the 11 row state. The inserted row is unrelated to the previous TBI and RBI rows. A delete operation (entry #2) and update operation (entry #3) are not allowed since the TBI and RBI rows cannot be found. An abort (entry #4) of the current request causes the rows to maintain their respective states, but the RBI row will become the current row upon rollback. An abort (entry #5) of the current transaction causes the rows to maintain their respective states, but the TBI row will become the current row upon rollback.

TABLE 12

| # | Row State | Inputs | Outputs | Next Row State |
|---|---|---|---|---|
| 1 | 01, 10 | Insert (cr, or, ot) | nr → 11 | 11 (g)<br>Unrelated:<br>01, 10 (g) |
| 2 | | Delete | — | ERROR |
| 3 | | Update | — | ERROR |
| 4 | | Abort (cr) | | 01, 10 (ar) |
| 5 | | Abort (ct) | | 01, 10 (at) |

Table 13 below shows processing of a row associated with a TBI row, RBI row, and RAI row. An insert operation (entry #1) is not allowed.

A delete operation (entry #2) of a row associated with the current request causes the RAI row to be deleted (since it is the RAI of the current request and the RBI image already exists). A delete operation (entry #3) of a row associated with an old request in the current transaction causes the RBI row to be deleted while the RAI row becomes the RBI row. A delete operation (entry #4) of a row associated with an old transaction causes the RAI row to become the TBI row and the TBI and RBI rows to be deleted.

An update operation (entry #5) of a row associated with the current request causes the RAI row to be updated (while maintaining the same row state). An update operation (entry #6) of a row associated with an old request causes the RBI row to be deleted, the RAI row to be changed to the RBI row, and a new RAI row to be added containing the updated image. An update operation (entry #7) of a row associated with an old transaction causes the TBI and RBI rows to be deleted and the RAI row to be changed to the TBI row. A new RAI row is added that contains the updated image.

An abort (entry #8) of a current request causes the rows to maintain their respective states, with the RAI row deleted in the rollback process. An abort (entry #9) of a current transaction causes the rows to maintain their respective states, with all rows removed by the rollback process except the TBI row.

TABLE 13

| # | Row State | Inputs | Outputs | Next Row State |
|---|---|---|---|---|
| 1 | 01, 10, 11 | Insert | — | ERROR |
| 2 | | Delete (cr) | 11 → x | 01, 10 (g) |
| 3 | | Delete (or) | 10 → x<br>11 → 10 | 01, 10, 11 (g) |
| 4 | | Delete (ot) | 11 → 01<br>10 → x<br>01 → x | 01 (g) |
| 5 | | Update (cr) | 11 + u → 11 | 01, 10, 11 (g) |
| 6 | | Update (or) | 10 → x<br>11 → 10<br>11 + u → 11 | 01, 10, 11 (g) |
| 7 | | Update (ot) | 01 → x<br>10 → x<br>11 → 01<br>11 + u → 11 | 01, 11 (g) |
| 8 | | Abort (cr) | | 01, 10, 11 (ar) |
| 9 | | Abort (ct) | | 01, 10, 11 (at) |

Figure 6:
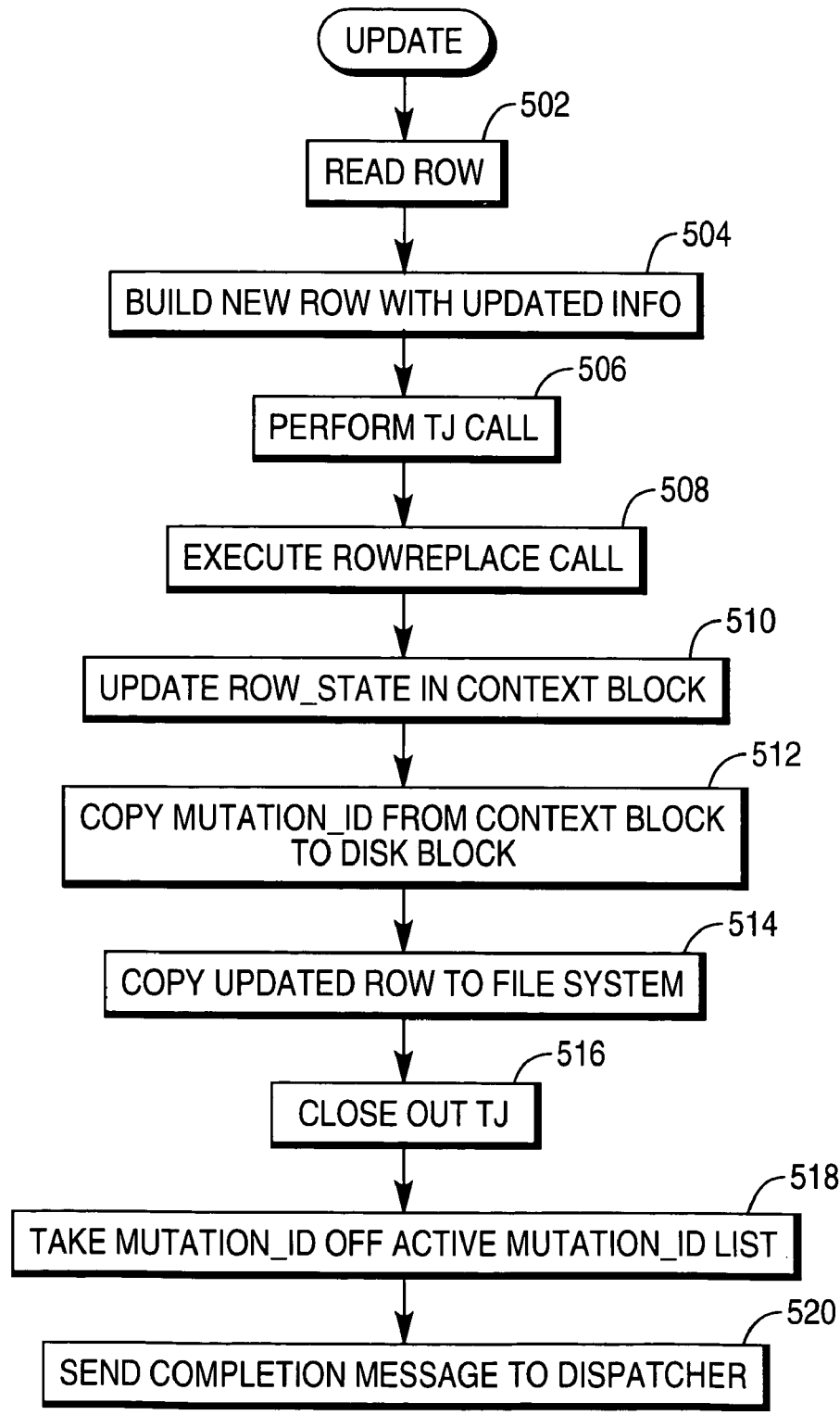
FIG. 6 is a flow diagram of an UPDATE operation in one example embodiment.

Referring to FIG. 6, an example process for updating a row is illustrated. A row update involves first reading the row from a table, updating the content of the row, and writing the row back to the table. The read request is submitted by the AWT 104 (at 502) as a file system call. The retrieved row is sent to the AWT 104, which builds (at 504) a new row with the updated information. A call to the transient journal is performed (at 506) to write to the journal the original read row (the before image). Next, a RowReplace file system call is performed (at 508), in which the ROW_STATE field 108 in the context block 112 pointing at the row to be replaced is changed (at 510) from 00 to 01 (transaction before image). The MUTATION_ID field 110 is copied (at 512) from the context block 112 to the disk block 1116. The MUTATION_ID is also added to the ACTIVE-_MUTATIO_ID list 122. The updated row is then copied (at 514) to the file system 114. The updated row has ROW-_STATE equal 11 (request after image). The MUTA-TION_ID field 110 in the context block 112 is also associated with this row. The row identifier (ROW_ID) remains the same.

When the transaction commits, the end processing includes closing out (at 516) the transient journal 118 to end the transaction, removing (at 518) the MUTATION_ID of the row from the ACTIVE_MUTATION_ID list, and sending a completion message (at 520) to the dispatcher 102.

Instructions of the various software routines or modules discussed herein may be stored on one or more storage units in the corresponding systems and loaded for execution on corresponding control units. The control units include microprocessors, microcontrollers, processor cards (including one or more microprocessors or microcontrollers), or other control or computing devices. As used here, a "controller" refers to hardware, software, or a combination thereof. A "controller" can refer to a single component or to plural components (whether software or hardware).

The storage units may include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact disks (CDs) or digital video disks (DVDs). Instructions that make up the various software routines or modules in a node and stored in a respective storage unit when executed by a control unit cause the corresponding system to perform programmed acts.

The instructions of the software routines or modules are loaded or transported into the system in one of many different ways. For example, code segments including instructions stored on floppy disks, CD or DVD media, a hard disk, or transported through a network interface card, modem, or other interface device may be loaded into the node and executed as corresponding software routines or modules. In the loading or transport process, data signals that are embodied in carrier waves (transmitted over telephone lines, network lines, wireless links, cables, and the like) may communicate the code segments, including instructions, to the node. Such carrier waves are in the form of electrical, optical, acoustical, electromagnetic, or other types of signals.

While the present invention has been described with respect to a limited number of embodiments, those skilled in the art will appreciate numerous modifications and variations therefrom. It is intended that the appended claims cover such modifications and variations as fall within the true spirit and scope of this present invention.

What is claimed is:

1. A database system comprising:
   one or more storage devices containing a table having plural rows,
   the plural rows including a first row containing a before image representing data of the first row of the table before a data modification operation on the first row and a second row containing an after image representing data of the first row of the table after processing by the data modification operation; and
   a module, in response to a read request from a requester, to:
   return the data in the second row to the requester under a normal condition, and
   return the data in the first row to the requester under an abort condition in which the data modification operation is aborted, the abort condition causing a rollback operation involving the first and second rows to occur, the module to return data in the first row to the requester in response to the read request under the abort condition without having to wait for the rollback operation to complete.

2. The database system of claim 1, wherein the one or more storage devices further contain identifiers to identify a state of each row.

3. The database system of claim 2, wherein the identifiers are contained in the table.

4. The database system of claim 1, wherein each of the first and second rows are associated with a row identifier, the row identifiers of the first and second rows having a first value.

5. The database system of claim 4, wherein the table further contains state identifiers to identify a before image state of the first row and an after image state of the second row.

6. The database system of claim 1, wherein the data modification operation is performed in a transaction, the transaction having one or more requests, wherein the first row contains a transaction before image representing data before the beginning of the transaction, and wherein the plural rows further comprise a third row containing a request before image representing data before the beginning of a request in the transaction.

7. The database system of claim 5, wherein the module is adapted to transition the state of each row based on a data manipulation command.

8. The database system of claim 1, further comprising a rollback module adapted to perform the rollback operation and to mark the first row as containing a current image in response to the rollback operation.

9. The database system of claim 8, wherein the rollback module is adapted to further remove the second row in response to the rollback operation.

10. The database system of claim 1, wherein the table contains a first row identifier associated with the first and second rows, a first state identifier having a first value associated with the first row, and a second state identifier having a second value associated with the second row.

11. The database system of claim 10, wherein the table further contains a mutation identifier associated with the first row identifier to identify that the modification operation is occurring with respect to one or more rows associated with the first row identifier.

12. The database system of claim 11, wherein the mutation identifier changes value with each new modification operation.

13. The database system of claim 12, wherein the module is adapted to return a row based on the mutation identifier and state identifier information.

14. The database system of claim 12, wherein the one or more storage devices further contain an active mutation identifier list having plural mutation identifiers associated with respective plural active modification operations.

15. The database system of claim 14, wherein the one or more storage devices further contain an abort mutation identifier list having plural mutation identifiers associated with respective plural aborts of modification operations.

16. The database system of claim 1, wherein the table comprises a relational table for storing data of a database.

17. The database system of claim 1, further comprising:
   plural storage elements to store the table; and
   plural access module processors to enable parallel access of the plural storage elements.

18. The database system of claim 1, wherein the data modification operation is responsive to a Structured Query Language (SQL) query, and the data of the first row is modified by the data modification operation responsive to the SQL query.

19. The database system of claim 18, wherein the read request is responsive to another SQL query.

20. The database system of claim 19, wherein the table further contains state identifiers associated with respective rows, the state identifier associated with the first row having a first value to indicate that the first row contains the before image, and the state identifier associated with the second row having a second value to indicate that the second row contains the after image.

21. The database system of claim 1, wherein the read request is invoked in response to a user request, and the first row is accessible by the user request even though the rollback operation is being performed, the module to return data in the first row to the requester under the abort condition in response to the read request while the rollback operation is occurring.

22. A database system comprising:
one or more storage devices containing a table having plural rows,
the plural rows including a first row containing a before image representing data before a data modification operation and a second row containing an after image representing data processed by the data modification operation,
wherein the table contains a first row identifier associated with the first and second rows, a first state identifier having a first value associated with the first row, and a second state identifier having a second value associated with the second row,
wherein the table further contains a mutation identifier associated with the first row identifier to identify that the modification operation is occurring with respect to one or more rows associated with the first row identifier,
wherein the mutation identifier changes value with each new modification operation,
wherein the data modification operation is performed in a transaction, each transaction having one or more requests, the mutation identifier having a transaction identifier portion and a request identifier portion.

23. The database system of claim 22, wherein the transaction identifier portion has a value that increments with each new transaction.

24. A method of providing access in a database system comprising:
storing data in rows of a table;
in response to a data modification operation of a first row, marking the first row as a before image row containing data of the first row before the start of the data modification operation on the first row and creating a second row as an after image of the first row containing data processed by the data modification operation;
wherein the first and second rows are stored in the table;
in response to a read request from a requester returning data from the first row to the requester under a first condition and returning data from the second row to the requester under a second condition; and
rolling back to the first row if the data modification operation aborts, the first condition being an abort condition, wherein the first row is accessible for user request while the rollback is being performed.

25. The method of claim 24, further comprising deleting or marking as available for reuse the second row during a rollback process in response to the abort.

26. An article comprising at least one storage medium containing instructions that when executed cause a system to:
store data in rows of a table;
store a state identifier associated with each row, a first state identifier having a first value to indicate a first row as being a before image of a data modification operation on the first row of the table and a second state identifier having a second value to indicate a second row as being an after image of the data modification operation on the first row of the table,
wherein the first and second rows are stored in the table; and
in response to a read request from a requester,
returning data from the second row to the requester under a normal condition, and
returning data from the first row to the requester under an abort condition, the abort condition to cause a rollback operation to be performed, wherein returning data from the first row to the requester under the abort condition in response to the read request occurs without having to wait for the rollback operation to complete.

27. The article of claim 26, wherein storing data in rows of the table comprises storing database data in rows of a relational table.

28. The article of claim 26, wherein the instructions when executed cause the system to:
receive a first Structured Query Language (SQL) query; and
invoke the data modification operation in response to the first SQL query.

29. The article of claim 28, wherein the instructions when executed cause the system to:
receive a second SQL query; and
invoke the read request by the requester in response to the second SQL query.

30. The article of claim 26, wherein returning data from the first row to the requester under an abort condition in response to the read request is performed while the rollback operation is occurring.

31. A method of providing access in a database system comprising:
storing data in rows of a table;
in response to a data modification operation of a first row, marking the first row as a before image row containing data of the first row before the start of the data modification operation on the first row, and creating a second row as an after image of the first row containing data processed by the data modification operation;
wherein the first and second rows are stored in the table;
in response to a read request from a requester, returning data from the first row to the requester under a first condition, and returning data from the second row to the requester under a second condition;
wherein the first condition comprises an abort condition; and
performing a rollback operation involving the first and second rows in response to the abort condition;
wherein returning data from the first row to the requester under the abort condition in response to the read request occurs without having to wait for the rollback operation to complete.

32. The method of claim 31, wherein returning data from the first row to the requester under the abort condition in response to the read request is performed while the rollback operation is occurring.

33. The method of claim 31, further comprising:
receiving a first Structured Query Language (SQL) query; and invoking the data modification operation in response to the first SQL query.

34. The method of claim 33, further comprising setting a first state identifier in the table to a first value to identify the first row as the before image row and setting a second state identifier in the table to a second value to identify the second row as the after image row.

35. The method of claim 33, further comprising:

receiving a second SQL query; and invoking the read request by the requester in response to the second SQL query.

* * * * *